United States Patent
Eslambolchi et al.

[11] Patent Number: 6,148,521
[45] Date of Patent: *Nov. 21, 2000

[54] METHOD AND APPARATUS FOR SLITTING OPTICAL POWER GROUND WIRES

[75] Inventors: Hossein Eslambolchi, Basking Ridge, N.J.; John Sinclair Huffman, Mc Donough; Ronald L. Sims, Conyers, both of Ga.

[73] Assignee: AT&T Corp., New York, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 09/209,786

[22] Filed: Dec. 11, 1998

[51] Int. Cl.⁷ .............................. B21F 13/00; H02G 1/12
[52] U.S. Cl. .......................... 30/90.4; 30/90.8; 30/90.9; 83/924; 81/9.4; 81/9.44
[58] Field of Search .................. 30/90.4, 90.8, 30/90.9, 91.1, 90.6, 91.2, 90.1; 29/825; 81/9.51, 9.4, 9.44; 83/924, 743, 744, 745

[56] References Cited

U.S. PATENT DOCUMENTS

| | | | |
|---|---|---|---|
| 2,559,387 | 7/1951 | Baker | 30/90.4 |
| 2,561,099 | 7/1951 | Costelow | 30/91.1 |
| 2,616,172 | 11/1952 | Parker | 30/90.4 |
| 2,654,941 | 10/1953 | Schleimer | 30/90.3 |
| 2,721,384 | 10/1955 | Bell | 30/91.1 |
| 2,761,211 | 9/1956 | Grant | 30/90.4 |
| 3,091,031 | 5/1963 | Grant | 30/90.4 |
| 3,175,430 | 3/1965 | Smith et al. | 81/9.51 |
| 3,462,052 | 8/1969 | Wagner | 30/90.4 |
| 3,613,235 | 10/1971 | McCormick | 30/91.1 |
| 3,624,901 | 12/1971 | Petit et al. | 30/90.4 |
| 3,914,864 | 10/1975 | Prince | 30/90.6 |
| 3,938,248 | 2/1976 | Krampe | 30/90.4 |
| 3,988,826 | 11/1976 | Heikkala | 30/90.4 |
| 4,534,254 | 8/1985 | Budzich et al. | 83/924 |
| 4,649,636 | 3/1987 | Arbogast, Jr. et al. | 81/9.51 |
| 4,769,909 | 9/1988 | Ducret | 30/91.1 |
| 4,884,339 | 12/1989 | Custin | 30/90.4 |
| 5,195,158 | 3/1993 | Bottoms, Jr. et al. | |
| 5,204,926 | 4/1993 | Bottoms, Jr. et al. | |
| 5,274,725 | 12/1993 | Bottoms, Jr. et al. | |
| 5,337,479 | 8/1994 | Ducret | 30/90.6 |
| 5,495,546 | 2/1996 | Bottoms, Jr. et al. | |
| 5,787,217 | 7/1998 | Traut et al. | |
| 5,822,863 | 10/1998 | Ott | 30/90.4 |

*Primary Examiner*—David P. Bryant
*Assistant Examiner*—Marc Jimenez

[57] ABSTRACT

A tube slitter for removing the outer metallic cladding of an optical power ground wire includes a channel guide for directing the movement of the tube slitter along the length of the ground wire. The ground wire includes an inner grooved spacer that engages with the channel guide. A cutting wheel is formed within the tube slitter and is free to rotate as the slitter is pulled along the length of the ground wire. The cutting wheel is positioned to provide a depth of cut sufficient to slit open the cladding tube without damaging the underlying optical fibers.

4 Claims, 2 Drawing Sheets

METHOD AND APPARATUS FOR SLITTING OPTICAL POWER GROUND WIRES

TECHNICAL FIELD

The present invention relates to a method and apparatus for slitting optical power ground wires and, more particularly to a method and apparatus utilizing a cutting tool including a specially designed end profile that guides along the grooved core of the ground wire and enables an attached cutting wheel to slit the exterior metal tube of the optical power ground wire.

BACKGROUND OF THE INVENTION

An electrical power transmission network typically comprises an electrical power generation source that is connected to an electrical power distribution network by overhead electrically conductive cables suspended between spaced-apart towers that are installed along electric utility right-of-ways. These electrically conductive cables are susceptible to lightning strikes because of the conductive characteristic of the cabling and the height of the support towers. Cables called "ground wires" are typically suspended between the spaced-apart support towers and above the base electrical conductors of the power transmission network to protect from the high current surges presented by direct or nearby lightning strikes. These ground wires, also called shield wires or earth wires, provide a path for the high current transients generated by lightning strikes within the proximity of the ground wire to safely discharge via the ground wire, the local support towers, and the ground.

The electric utility right-of-ways for overhead electrical power transmission lines often provide an attractive path for the installation of overhead telecommunication cables. Because the communications content of light signals carried by optical fibers are not affected by the high voltage and current environment typically found within an electrical power transmission network, ground wire cables are often combined with an optical fiber or, more often, a bundle of optical fibers, to efficiently provide lightwave communications via the existing overhead transmission network, More specifically, a bundle of optical fibers are typically mounted within an electrical conductor to form a ground wire cable that is installed between spaced-apart support towers and above the electrical transmission lines. In this manner, the ground wire cable functions as both a ground wire and a telecommunications cable and thereby enables the existing electric utility right-of-way to be used for telecommunications.

A conventional prior art optical power ground wire cable comprises aluminum-clad steel wires and an aluminum tube filled with a grooved spacer inside the tube. Within the grooves of this spacer are bare optical fibers that are used for transmission of the telecommunications signals. Restoration of this type of system is extremely time-consuming due to the difficulty in gaining access to the fibers within the aluminum steel-clad tube. In particular, the task of exposing the optical fibers within the ground wire requires that first the outer steel cables be removed so as to expose the inner metal tube. The next step is to remove the aluminum metal tube without damaging the fibers lying underneath the tube. In most circumstances, the metal tube is removed by scoring it with a diagonal tube cutter and peeling the metal off the grooved spacer with hand pliers. This process is extremely tedious and time-consuming, often resulting in damaged fibers. When the fibers are damaged, the process must be re-done to ensure adequate lengths of non-damaged fiber for splicing.

A need remains in the art, therefore, for an improved system and method for removing the aluminum cladding on optical power ground wires.

SUMMARY OF THE INVENTION

The need remaining in the prior art is addressed by the present invention, which relates to a method and apparatus for slitting optical power ground wires and, more particularly to a method and apparatus utilizing a cutting tool including a specially designed end profile that guides along the grooved core of the ground wire and enables an attached cutting wheel to slit the exterior metal tube of the optical power ground wire.

In accordance with the present invention, the end profile of the cutting tool is formed to fit around one of the grooves of the inner spacer so as to provide a consistently straight cut along the length of the tube. A cutting wheel, embedded within the tool yet free to rotate, ensures a consistent depth of cut as the tool is moved along the length of the tube.

In a preferred embodiment of the present invention, the cutting tool includes a ratchet handle for pulling the tool along the tube, with a locking mechanism to hold the tool in position around the tube. The housing for the tool preferably holds two cutting wheels, diametrically opposed and positioned to form slits along the top and bottom of the aluminum tube.

Other and further embodiments of the present invention will become apparent during the course of the following discussion and by reference to the accompanying drawings.

BRIEF DESCRIPTION OF THE DRAWINGS

Referring now to the drawings, where like numerals represent like parts in several views.

DETAILED DESCRIPTION

Figure 1:
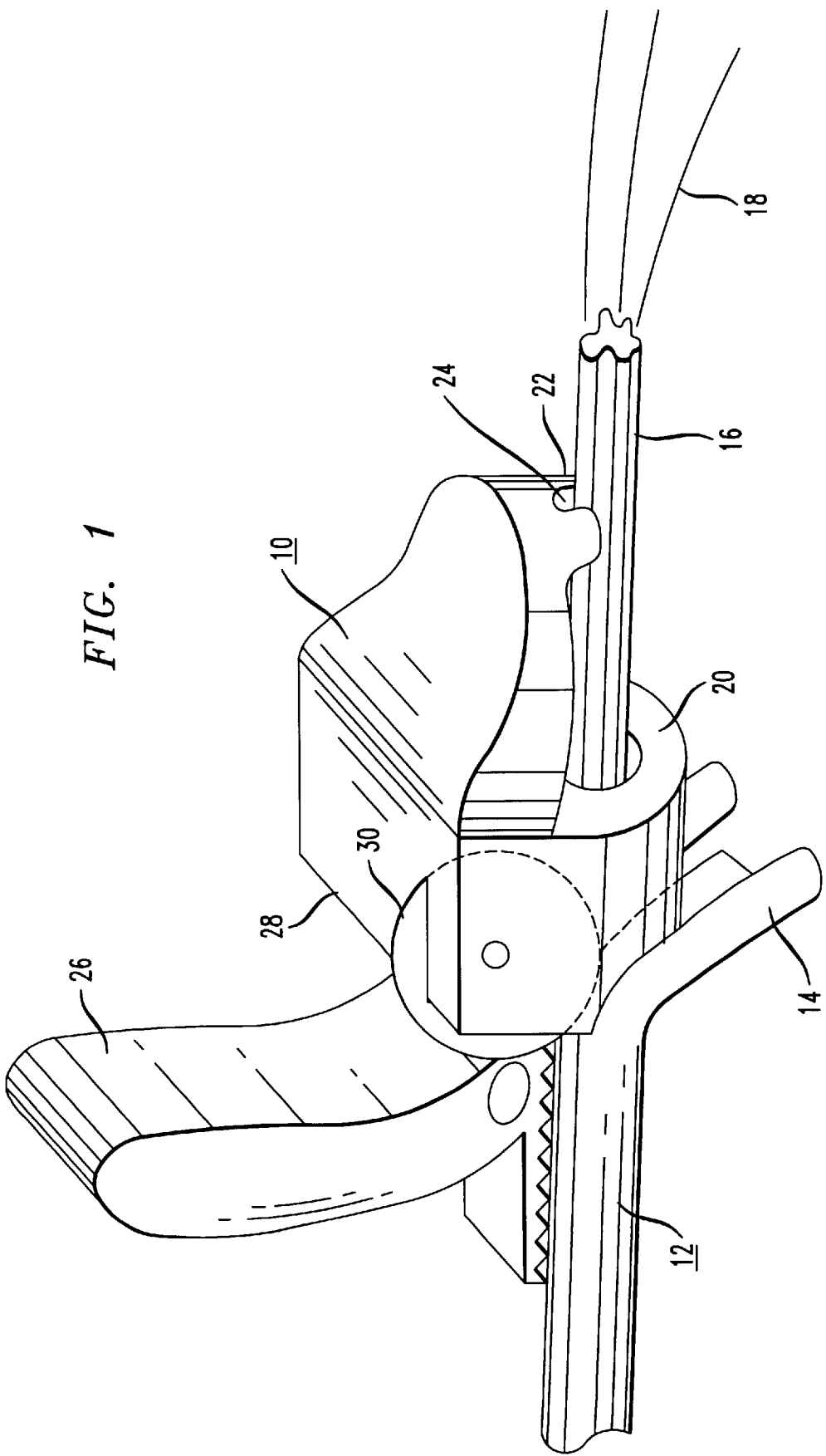
FIG. 1 illustrates an exemplary optical power ground wire slitting tool formed in accordance with the present invention.

FIG. 1 illustrates an exemplary optical power ground wire tube slitter 10 formed in accordance with the present invention. Also shown in FIG. 1 is a conventional optical power ground wire 12 (with the outer cables removed), including in particular an aluminum tube 14 and grooved spacer 16, with a plurality of bare wires 18 disposed within the grooves of spacer 16. In accordance with the present invention, an end portion of optical power ground wire 12 is first cut to expose spacer 16. Tube slitter 10 is then inserted to surround the cut end. Referring to FIG. 1, tube slitter 10 is formed to include a cylindrical central portion 20 that is sized to fit over the exposed spacer 16. A first end 22 of tube slitter 10 is formed to include a guide channel 24 that fits over one groove of spacer 16, as shown in FIG. 1.

A ratchet handle 26 of tube slitter 10 is attached at the opposite, second end 28 of tulle slitter 10 and is used to pull tube slitter 10 along the length of the cable. In accordance with the present invention, a cutting wheel 30 is embedded within tube slitter 10, while free to rotate and is disposed near ratchet handle 26 and in line with guide channel 24. Therefore, as ratchet handle 26 moves along cable 12, guide channel 24 maintains the relative positioning between the splitter tool and the cable, allowing cutting wheel 30 to rotate and slit open aluminum tube 14. In particular, cutting wheel 30 is positioned so that the depth of cut is sufficient to cut open aluminum tube 14 within damaging included optical fibers 18. The force of the rearward movement of cylindrical central portion 20 is sufficient to spread apart aluminum tube 14, thereby removing the tube and exposing the underlying fibers.

Figure 2:
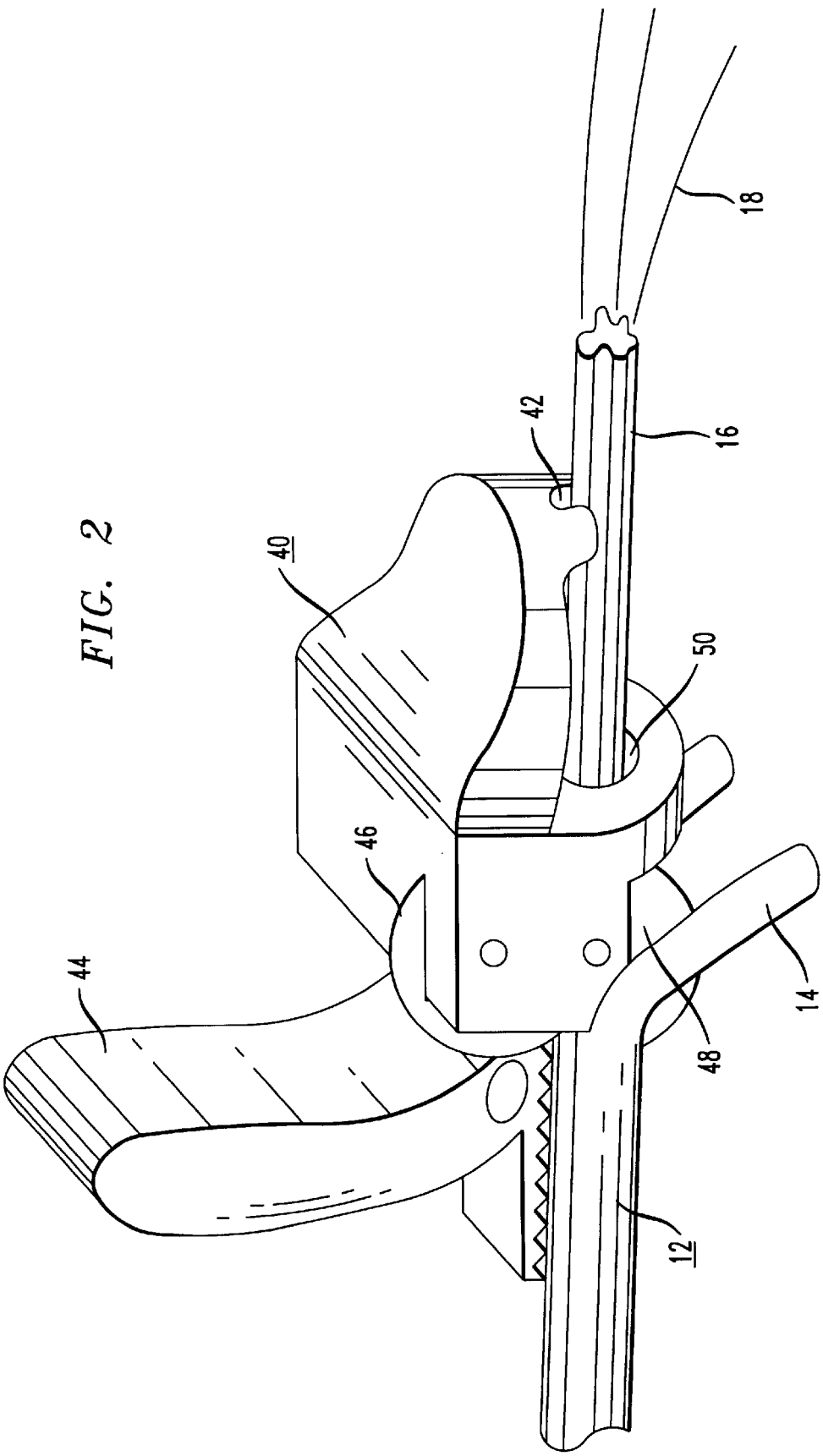
FIG. 2 illustrates an alternative embodiment of the present invention, utilizing a pair of cutting wheels disposed within the tool housing.

In order to further facilitate the removal of aluminum tube 14 and expose the bare fibers 18, a second cutting wheel may be included so that the top and bottom surface of tube 14 may be simultaneously removed. FIG. 2 illustrates a tube slitter 40 of this particular embodiment. As shown, tube slitter 40 includes a guide channel 42 similar to guide channel 24 of tube slitter 10 of FIG. 1. Further, tube slitter 40 includes a similar ratchet handle 44 and cutting wheel 46. In this particular embodiment, a second cutting wheel 48 is included and used to form a slit along the bottom surface of tube 14 at the same time that first cutting wheel 46 is forming a slit along the top surface of tube 14. Tube 14 is then easily removed as two separate piece parts as ratchet handle 44 moves tube slitter 40 along the length of the cable. The embodiment of FIG. 2 further includes a second channel guide 50, formed within central cylindrical portion 52 and positioned to rest within an opposing opening in spacer 16.

Although the above-described embodiments of the present invention are directed toward the removal of an aluminum cladding tube, it is to be understood that the slitting method and apparatus of the present invention may be used to remove any sheath material used to encapsulate optical fibers within an optical ground wire. As long as the optical power ground wire arrangement includes a central grooved spacer, the tool of the present invention will be effective in slitting the tube and exposing the encapsulated optical fibers.

What is claimed is:

1. A tool for slitting and removing a cladding layer included in an optical power ground wire, the ground wire including an inner grooved spacer with optical fibers disposed along the grooves, said tool comprising a central cylindrical member disposed to surround said ground wire;

a guide channel disposed at a first end of said tool beyond the central cylindrical member, said guide channel exhibiting a profile sized to fit around and capture a first groove of an optical power ground wire inner spacer, preventing radial movement of the tool with respect to said optical power ground wire;

a handle for moving said tool along the length of the optical power ground wire; and at least one cutting wheel disposed between the handle and the guide channel, said at least one cutting wheel held in a manner such that said at least one cutting wheel is free to rotate and engage an optical power ground wire cladding layer so as to slit open said optical power ground wire cladding layer without cutting any optical fibers disposed beneath said optical power ground wire cladding layer.

2. A tool as defined in claim 1 wherein the at least one cutting wheel comprises a single cutting wheel disposed between the handle and the guide channel, said cutting wheel aligned with said guide channel so as to form a slit in an optical power ground wire cladding layer along a top surface of said cladding layer.

3. A tool as defined in claim 1 wherein the at least one cutting wheel comprises a pair of cutting wheels including a first cutting wheel disposed between the handle and the guide channel and aligned with said guide channel so as to form a first slit in an optical power ground wire cladding layer along a top surface of said cladding layer; and a second cutting wheel disposed within the central cylindrical member and positioned in opposition to said first cutting wheel so as to form a second slit in an optical power ground wire cladding layer along a bottom surface of said cladding layer.

4. A tool as defined in claim 3 wherein the tool further comprises a second guide channel, formed within the central cylindrical member, including a guide profile to surround a second groove formed in an optical power ground wire spacer.

\* \* \* \* \*